Dec. 18, 1956 J. F. BYRD ET AL 2,774,824
SOUND CHANGEOVER SYSTEM
Filed June 10, 1952
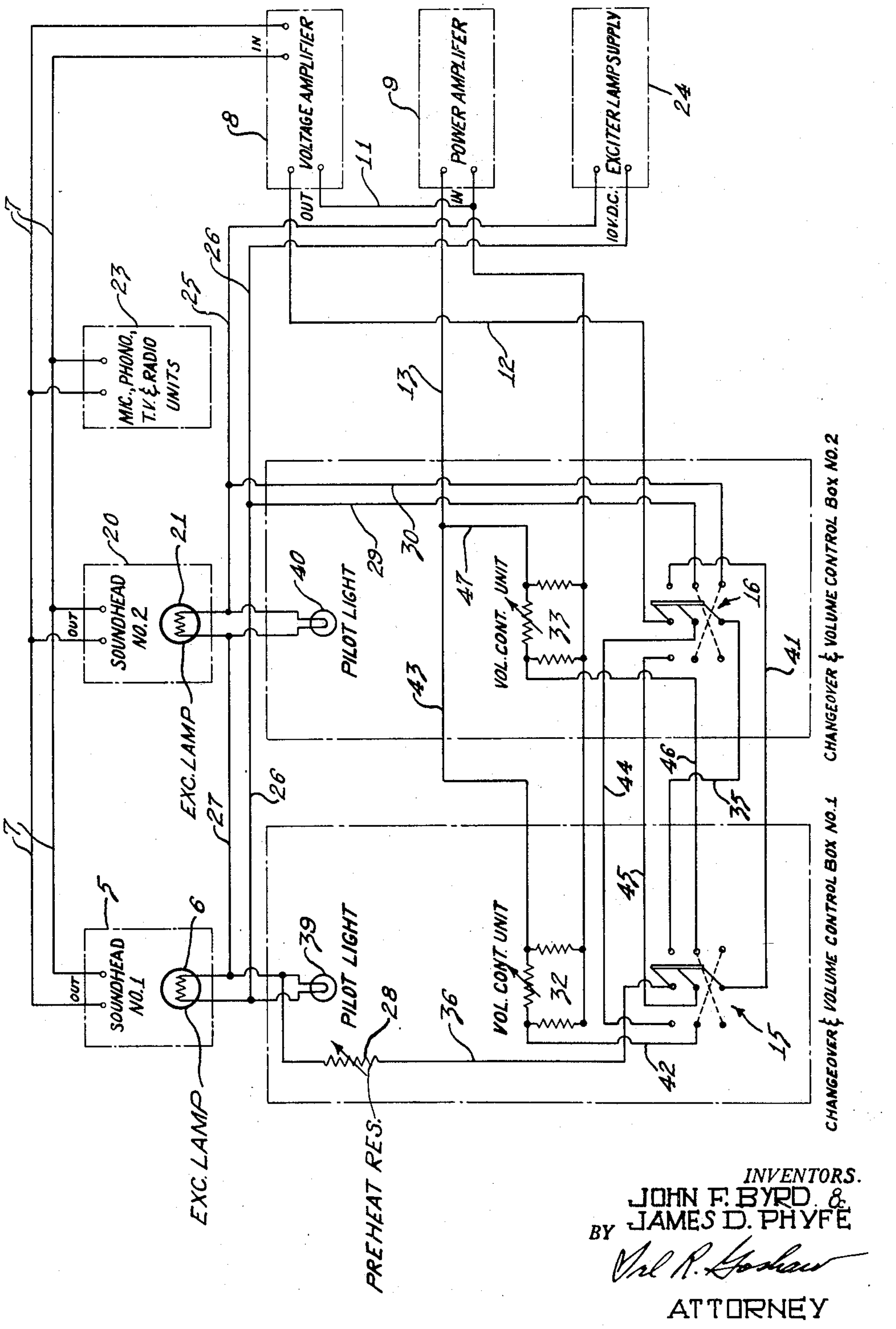
INVENTORS.
JOHN F. BYRD &
JAMES D. PHYFE
BY Val R. Goshaw
ATTORNEY 2,774,824

SOUND CHANGEOVER SYSTEM

John F. Byrd, Ashland, and James D. Phyfe, Moorestown, N. J., assignors to Radio Corporation of America, a corporation of Delaware Application June 10, 1952, Serial No. 292,762

The terminal fifteen years of the term of the patent to be granted has been disclaimed 7 Claims. (Cl. 179—100.3)

This invention relates to sound changeover systems between various types of sound signal reproducers and generators, such as phonographs and theater picture projector sound reproducers, and particularly to a simple, economical, and all-electric system for performing the changeover.

Sound changeover systems of various types are well-known, these systems using various types of mechanisms and circuits. Many of the present systems use volume control rods across the front wall of sound picture projector booths in theaters in order to vary the volume being reproduced. Other types only control the reproducer at which it is positioned.

The present invention uses simply a three-pole, double throw switch at each reproducer, which may be actuated by a rotatable knob to switch either of two reproducers into service. In addition to switching the sound from one sound source to another, it also energizes a pilot light at the sound source being reproduced. Furthermore, the exciter lamp on the machine which is not reproducing is shunted to a partially energized stand-by condition, so that upon normal energization, it will quickly return to full brightness. The volume control from each reproducer is connected between the voltage amplifier and the picture amplifier so that the minimum of disturbance is created in the electrical current-to-sound wave transducers or loudspeakers. Each volume control unit may be preset before it is connected in the reproducing circuit.

The principal object of the invention, therefore, is to facilitate the switching of sound between sound signal sources.

Another object of the invention is to provide an improved sound changeover system between a plurality of sound sources to be reproduced.

A further object of the invention is to provide an all-electrical sound changeover system which functions by a simple rotation of switches at each reproducer, which indicates the reproducer being operated and which provides partial energization of the reproducer not in operation.

Although the novel features which are believed to be characteristic of this invention will be pointed out with particularity in the appended claims, the manner of its organization and the mode of its operation will be better understood by referring to the following description, read in conjunction with the accompanying drawings, forming a part hereof, in which the single figure is a combination schematic and diagrammatic drawing of the changeover system embodying the invention.

Referring now to the drawings, one sound current generator may consist of a film phonograph or soundhead 5 which utilizes an exciter lamp 6. The output of this soundhead, referred to as soundhead No. 1, is fed over conductors 7 to the input of a voltage amplifier 8. The output of the voltage amplifier is connected to a power amplifier 9 over conductors 11, 12, and 13, according to the position of a pair of switches shown generally at 15 and 16. The power amplifier may be connected to loudspeakers or sound signal recorders.

A second sound current generator may be a film reproducer or soundhead 20 having an exciter lamp 21, which is indicated as soundhead No. 2. The output of this soundhead is connected over conductors 7 to the input of voltage amplifier 8. To indicate that other types of sound sources may be used, a microphone, phonograph, or television and radio unit is shown connected to conductors 7. The present system is primarily concerned with the switching between two sound sources of any type, such as soundheads No. 1 and No. 2. This is accomplished primarily by reducing the voltage on one of the exciter lamps 6 and 21 and increasing it on the other by the switches 15 and 16. These switches are triple pole, double throw switches which can be constructed in the form of rotating drums actuated by hand with finger knobs. The exciter lamps 6 and 21 are supplied with direct current from a source 24 over conductors 25, 26, and 27, a resistor 28 being shunted across the inoperative soundhead by the switches 15 and 16 over conductors 29, 30, and 36.

A pair of 500 to 1000 ohm volume control attenuator units are shown at 32 and 33, which are connected between the voltage amplifier 8 and power amplifier 9 according to the position of the switches 15 and 16, as described hereinafter.

Referring now specifically to the circuit, let us assume that both switches 15 and 16 are closed in their right-hand positions. Under these conditions, the soundhead No. 1 is in operation, exciter lamp 6 being supplied with full current, and exciter lamp 21 being partially energized by being shunted by resistor 28. At the same time, the volume control unit 32 is connected between the voltage amplifier 8 and the power amplifier 9. Tracing the circuit for the lamps, it is from lamp supply 24 over conductor 25 to lamp 21, then over conductor 27 to lamp 6, and then back to the supply 24 over conductor 26, the two filaments being in series. However, the resistor 28 is shunted across lamp 21 over conductor 30, the lower blade of switch 16, conductor 35, the upper blade of switch 15, conductor 36, resistor 28, and conductor 27 to lamp 21. Thus, the currents flowing through this last circuit just traced and the lamp 21 supply full operating current to lamp 6, which also energizes a pilot light 39 to indicate that the soundhead No. 1 is functioning. There is insufficient voltage at this time to energize pilot light 40 of lamp 21. The volume control circuit with the switches in their right-hand positions is over conductor 12, the upper blade of switch 16, conductor 41, the lower blade of switch 15, conductor 42, volume control unit 32, conductor 43, and conductor 13. Thus, the reproduced volume from soundhead No. 1 is controlled by volume control unit 32, which may be varied while in use or preset before it is connected into the circuit.

Since one of the features of the present invention is that the sound may be switched at either soundhead by either switch, the next assumed condition is that switch 15 is still in its right-hand position, and switch 16 is thrown to the left. This arrangement of switches will now place the resistor 28 across exciter lamp 6 over conductor 29, the lower blade of switch 16, conductor 35, the upper blade of switch 15, conductor 36, to the lamp 6, while the full current will be supplied to exciter lamp 21, energizing pilot light 40. Simultaneously, the unit 33 will be switched between the amplifiers 8 and 9 over conductor 12, upper blade of switch 16, conductor 45, middle blade of switch 15, conductor 46, volume control unit 33, and conductor 47 to input conductor 13 of amplifier 9. Thus, the sound may be switched between soundheads 1 and 2 by switch 16 when the switch 15 is in the right-hand position.

Assuming now that switch 16 is in its right-hand position and switch 15 is in its left-hand position, then exciter lamp 21 of soundhead No. 2 is fully energized and volume control unit 33 is in circuit. With these connections, the lamp 6 is shunted over conductor 29, middle blade of switch 16, conductor 44, upper blade of switch 15, and conductor 36. The volume control unit 33 is in circuit over conductor 12, upper blade of switch 16, conductor 41, lower blade of switch 15, and conductor 46.

With both switches in their left-hand positions, lamp 21 is shunted over conductor 30, middle blade of switch 16, conductor 44, upper blade of switch 15, and conductor 36. Also, volume control unit 32 is in circuit over conductor 12, upper blade of switch 16, conductor 45, middle blade of switch 15, and conductor 42.

From the above description, it is observed that, by simple triple pole, double throw switches at each soundhead position, the switching of sound between sound sources may be made at either position. The switches perform three functions. First, the incoming exciter lamp is fully energized, and the outgoing exciter lamp is partially energized to be in ready position for the next energization. Secondly, the pilot light of the incoming soundhead is energized, and the pilot light of the outgoing soundhead is de-energized. Third, the volume control units for each head are connected between a low level amplifier and the input to a high level amplifier to reduce switching disturbance. The switching is all electrical and the system is economical to build and maintain.

We claim:

1. A system for switching between a plurality of sound film reproducers comprising a plurality of sound film reproducers, an exciter lamp in each of said reproducers adapted to illuminate sound film therein, a common energy supply for said exciter lamps, a double throw switch for each of said reproducers, a resistor, a fixed circuit between said exciter lamp supply and said exciter lamps in series, and a circuit between said exciter lamp supply, said resistor, and one of said exciter lamps in one position of said switches, said one exciter lamp being energized to normal operating condition and said other lamp being partially energized.

2. A system in accordance with claim 1 in which an associate pilot light is connected in parallel with each of said exciter lamps, each of said respective pilot lights being energized upon full energization of its associate exciter lamp.

3. A system in accordance with claim 1 in which are provided a low level amplifier, a high level amplifier, an associate volume control unit for each of said reproducers, and a circuit between said switches, said amplifiers, and the volume control unit associated with said reproducer having said normally energized exciter lamp.

4. An electrical switching circuit for energizing a pair of sound film reproducers at mutually exclusive times comprising a pair of reproducers, a lamp for each reproducer adapted to illuminate sound film therein, a volume control unit for each reproducer, a common energy supply for said lamps, a resistor, a two-position switch at each reproducer, a fixed circuit between said energy supply and said lamps in series, and circuit connections between all of said elements, one position of said switches providing a circuit between said energy supply, one of said lamps and said resistor, the other of said lamps being connected in parallel with said resistor, and a circuit between said volume control unit, the output of said reproducer having said first-mentioned lamp associated therewith, and said switches, another position of said switches providing a circuit between said energy supply, said other lamp and said resistor, said first-mentioned lamp being connected in parallel with said resistor, and a circuit between said other volume control unit, the output of said reproducer having said other lamp associated therewith and said switches.

5. An electrical switching circuit in accordance with claim 4 in which a pilot lamp is provided in parallel with each of said exciter lamps.

6. An electrical changeover system comprising a pair of sound current generators, a lamp for each of said generators, each of said generators producing sound currents when its respective lamp is energized to operating condition, a triple pole, double throw switch for each generator, a volume control unit for each generator, a resistor, a common energy supply for said lamps, a fixed circuit between said energy supply and said lamps in series, a circuit between said energy supply, said resistor, said switches and one of said lamps, said other lamp being in parallel with said resistor, and a circuit between said switches and one of said volume control units.

7. An electrical changeover system in accordance with claim 6 in which a low level amplifier and a high level amplifier are provided, said last-mentioned circuit interconnecting said amplifiers over said one volume control unit and said switches.

References Cited in the file of this patent

UNITED STATES PATENTS

| | | |
|---|---|---|
| 1,769,909 | De Forest | July 1, 1930 |
| 1,989,963 | Baker | Feb. 5, 1935 |
| 1,990,388 | Lootens | Feb. 5, 1935 |
| 2,106,957 | Nielsen | Feb. 1, 1938 |
| 2,182,823 | Scheibell | Dec. 12, 1939 |
| 2,542,188 | Gates | Feb. 20, 1951 |